United States Patent
He et al.

(10) Patent No.: US 11,857,902 B2
(45) Date of Patent: Jan. 2, 2024

(54) HIGH-STABILITY SHALE GAS DESANDING DEVICE WITH GRAVEL STORAGE MECHANISM

(71) Applicant: TIANJIN UNIVERSITY, Tianjin (CN)

(72) Inventors: Li He, Tianjin (CN); Pengdong Yan, Tianjin (CN); Yizhong Chen, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 90 days.

(21) Appl. No.: 17/868,581

(22) Filed: Jul. 19, 2022

(65) Prior Publication Data
US 2023/0027306 A1    Jan. 26, 2023

(30) Foreign Application Priority Data
Jul. 22, 2021 (CN) .......................... 202110832463.4

(51) Int. Cl.
| | |
|---|---|
| *B01D 45/16* | (2006.01) |
| *B01D 45/14* | (2006.01) |
| *B04C 5/103* | (2006.01) |
| *B04C 9/00* | (2006.01) |

(52) U.S. Cl.
CPC ............. *B01D 45/16* (2013.01); *B01D 45/14* (2013.01); *B04C 5/103* (2013.01); *B04C 9/00* (2013.01); *B04C 2009/007* (2013.01)

(58) Field of Classification Search
CPC ........ B01D 45/16; B01D 45/14; B04C 5/103; B04C 9/00; B04C 2009/007; C10L 3/101
See application file for complete search history.

(56) References Cited

U.S. PATENT DOCUMENTS

| | | | | |
|---|---|---|---|---|
| 3,512,651 A | * | 5/1970 | Laval, Jr. ................ | B04C 5/103 |
| | | | | 209/733 |
| 3,934,990 A | * | 1/1976 | Ide, III .................. | B60T 17/004 |
| | | | | 55/432 |
| 4,072,481 A | * | 2/1978 | Laval, Jr. ................ | E21B 43/38 |
| | | | | 96/182 |
| 4,265,740 A | * | 5/1981 | Luthi ...................... | D21D 5/00 |
| | | | | 209/159 |
| 5,449,391 A | * | 9/1995 | Decker .................. | B01D 45/14 |
| | | | | 55/449 |

(Continued)

FOREIGN PATENT DOCUMENTS

CN            112495064 A       3/2021

*Primary Examiner* — Dung H Bui

(57) ABSTRACT

The present invention discloses a high-stability shale gas desanding device with a gravel storage mechanism, comprising a shale gas desanding assembly, a driving assembly, a flow stirring assembly and a flow guide assembly, wherein the shale gas desanding assembly comprises an outer side gas-solid separation tank, an inner side gas-solid separation tank is sleeved inside the outer side gas-solid separation tank, the inner side gas-solid separation tank is communicated with a shale gas mixture ingress pipe of the flow guide assembly, a top of the shale gas desanding assembly is communicated with an interior of the outer side gas-solid separation tank through a first pressure balance pipe, the outer side gas-solid separation tank is communicated with the shale gas mixture ingress pipe through a second pressure balance pipe, a pressure regulation and control assembly is arranged on the second pressure balance pipe.

6 Claims, 11 Drawing Sheets

(56) References Cited

U.S. PATENT DOCUMENTS

| | | | | |
|---|---|---|---|---|
| 6,312,594 | B1* | 11/2001 | Conrad | B04C 3/00 55/459.3 |
| 10,780,380 | B1* | 9/2020 | Rhodes | B01D 45/12 |
| 11,344,897 | B1* | 5/2022 | Garcia Soule | B04C 5/085 |
| 2006/0249458 | A1* | 11/2006 | Matabe | B01D 19/0015 95/82 |
| 2010/0180768 | A1* | 7/2010 | Folkvang | B04C 5/103 210/194 |
| 2014/0243571 | A1* | 8/2014 | Lyon | B04C 5/103 585/800 |
| 2014/0373492 | A1* | 12/2014 | Arefjord | B01D 45/12 55/462 |
| 2015/0165358 | A1* | 6/2015 | Hemstock | B01D 45/12 55/456 |
| 2018/0119704 | A1* | 5/2018 | Sano | B01D 45/16 |
| 2019/0030547 | A1* | 1/2019 | Kuhlmann | B04C 5/185 |
| 2019/0336904 | A1* | 11/2019 | Choi | B01D 45/16 |
| 2020/0001310 | A1* | 1/2020 | Shinoda | C10J 3/84 |
| 2020/0048998 | A1* | 2/2020 | Deroche | B04C 5/085 |
| 2020/0086234 | A1* | 3/2020 | Elms | B01D 17/0217 |
| 2021/0060467 | A1* | 3/2021 | Cognata | B01D 47/06 |
| 2021/0170318 | A1* | 6/2021 | Lu | B01D 45/08 |
| 2021/0178405 | A1* | 6/2021 | Bowley | B01D 45/12 |
| 2023/0012037 | A1* | 1/2023 | Harel | B04C 5/181 |

\* cited by examiner

HIGH-STABILITY SHALE GAS DESANDING DEVICE WITH GRAVEL STORAGE MECHANISM

CROSS-REFERENCE TO RELATED APPLICATION

This application claims priority from the Chinese patent application 202110832463.4 filed Jul. 22, 2021, the content of which is incorporated herein in the entirety by reference.

TECHNICAL FIELD

The present disclosure relates to the field of shale gas desanding technologies, and more particularly, to a high-stability shale gas desanding device with a gravel storage mechanism.

BACKGROUND ART

In related arts, a gas-solid separation device is generally used during shale gas desanding. At present, the previous gas-solid separation device for the shale gas desanding still has some defects. During gas-solid separation by using an airflow vortex, a state of the airflow vortex is always in a fixed state, which easily leads to dust adhesion to a wall body of the separation device, thus causing serious dust accumulation and even blockage of the separation device. In addition, insufficient airflow pressure often occurs at a shale gas mixture inlet end, which may lead to an instability of the airflow vortex, and reduce a subsequent gas-solid separation efficiency.

SUMMARY OF THE DISCLOSURE

The present disclosure aims to provide a high-stability shale gas desanding device with a gravel storage mechanism, which can prevent a gas-solid separation device from dust accumulation or blockage, enhance a stability of an airflow vortex, and improve a gas-solid separation efficiency.

In order to achieve the object above, the present disclosure provides the following technical solutions: a high-stability shale gas desanding device with a gravel storage mechanism comprises a shale gas desanding assembly, a driving assembly, a flow stirring assembly and a flow guide assembly, wherein the shale gas desanding assembly comprises an outer side gas-solid separation tank, an inner side gas-solid separation tank is sleeved inside the outer side gas-solid separation tank, the inner side gas-solid separation tank is communicated with a shale gas mixture ingress pipe of the flow guide assembly, a top portion of the shale gas desanding assembly is communicated with an interior of the outer side gas-solid separation tank through a first pressure balance pipe, the outer side gas-solid separation tank is communicated with the shale gas mixture ingress pipe through a second pressure balance pipe, a pressure regulation and control assembly is arranged on the second pressure balance pipe, the liftable and rotatable flow stirring assembly is further arranged inside the inner side gas-solid separation tank, and an input end of the flow stirring assembly is connected with an output end of the driving assembly.

Preferably, the inner side gas-solid separation tank and the outer side gas-solid separation tank are fixedly connected through a bridge-type connecting frame, and top portions of the outer side gas-solid separation tank and the inner side gas-solid separation tank are fixedly and hermetically connected with a same tank cover, an exhaust channel is clamped in the tank cover, a side end surface of the exhaust channel is clamped with the first pressure balance pipe, the other end of the first pressure balance pipe is clamped on a side end surface of the outer side gas-solid separation tank, and the first pressure balance pipe is further provided with a one-way valve.

Preferably, the driving assembly comprises a first support mesh panel, an arc surface of the first support mesh panel is fixedly connected with an inner side wall of the inner side gas-solid separation tank, a top portion of the first support mesh panel is clamped with a first bearing, a first adapter cylinder is sleeved in the first bearing, a first threaded cylinder is sleeved in the first adapter cylinder, a first threaded rod is threadedly connected on an internal thread surface of the first threaded cylinder, and a bottom portion of the first threaded rod is fixedly connected to a top portion of the first support mesh panel.

Preferably, an outer surface of the first threaded cylinder is fixedly connected with a first slidably connecting seat, the first slidably connecting seat is slidably connected in a first slidably connecting groove formed on an inner circular surface of the first adapter cylinder, a surface of the first adapter cylinder is fixedly connected with a first driven bevel gear, and a surface of the first driven bevel gear is meshed with a first driving bevel gear; the first driving bevel gear is fixedly connected to a surface of a second adapter cylinder, the surface of the second adapter cylinder is further sleeved with a second bearing, the second bearing is clamped on wall bodies of the outer side gas-solid separation tank and the inner side gas-solid separation tank respectively, an end portion of the second adapter cylinder is fixedly connected with an output end of an electric motor, and a side end surface of a body of the electric motor is fixedly connected with the side end surface of the outer side gas-solid separation tank through a shock absorbing seat.

Preferably, the flow stirring assembly comprises a connecting sleeve, the connecting sleeve is sleeved and fixed on a surface of the first threaded cylinder, an upper layer wheel disc and a lower layer wheel disc are sequentially fixed and connected on a circumferential surface of the connecting sleeve from top to bottom, and an arc connecting seat is slidably connected between the upper layer wheel disc and the lower layer wheel disc.

Preferably, a bottom portion of the arc connecting seat is provided with a second slidably connecting groove, a second slidably connecting seat is slidably connected in the second slidably connecting groove, an end surface inside the second slidably connecting groove is further fixedly connected with a side surface of the second slidably connecting seat through a first supporting spring, and a bottom portion of the second slidably connecting seat is fixedly connected to a top portion of the lower layer wheel disc.

Preferably, a top portion of the arc connecting seat is provided with a retracting groove, a bottom portion inside the retracting groove is connected with a movable flow stirring plate through a second supporting spring, a bottom portion of the upper layer wheel disc is further provided with an implanting groove matched with the movable flow stirring plate, one surfaces of the upper layer wheel disc and the lower layer wheel disc far away from each other are both fixedly connected with a fixed flow stirring plate, the fixed flow stirring plates and the movable flow stirring plates are staggered, and corners of the movable flow stirring plates are designed to be circular arcs.

Preferably, the flow guide assembly comprises the shale gas mixture ingress pipe, the shale gas mixture ingress pipe is provided with a first spherical valve, the shale gas mixture ingress pipe sequentially passes through wall bodies of the outer side gas-solid separation tank and the inner side gas-solid separation tank and extends inside the inner side gas-solid separation tank, and an upper portion of the first spherical valve is provided with a control knob.

Preferably, the pressure regulation and control assembly comprises a connecting pipe, the connecting pipe is sleeved on the second pressure balance pipe, an inner side wall of the second pressure balance pipe is fixedly connected with a conical body, the conical body is connected with a second spherical valve in an embedded mode, a spherical surface of the second spherical valve is fixedly connected with a guide rod, a surface of the guide rod is sleeved with a second threaded cylinder, and an outer circumferential surface of the second threaded cylinder is fixedly connected with an inner pipe wall of the connecting pipe through a fixing rib.

Preferably, one side inside the second threaded cylinder is threadedly matched with one side of a second threaded rod, an end portion of the second threaded rod is fixedly connected with one end of the guide rod through a third supporting spring, a surface on the other side of the second threaded rod is sleeved with a third adapter cylinder slidably matched with the second threaded rod, an inner side wall of the third adapter cylinder is provided with a third slidably connecting groove, a third slidably connecting seat is slidably connected in the third slidably connecting groove, the third slidably connecting seat is fixedly connected with the second threaded rod, a surface of the third adapter cylinder is sleeved with a third bearing, the third bearing is clamped on a second support mesh panel, an outer cambered surface of the second support mesh panel is fixedly connected with the inner pipe wall of the connecting pipe, a surface of the third adapter cylinder is fixedly connected with a second driven bevel gear, a surface of the second driven bevel gear is meshed with a second driving bevel gear, the second driving bevel gear is fixedly connected at a bottom portion of a fourth adapter cylinder, a surface of the fourth adapter cylinder is further sleeved with a fourth bearing, the fourth bearing is clamped on a top pipe wall of the connecting pipe, and a top end of the fourth adapter cylinder is fixedly connected with a knob.

Compared with the prior art, the present disclosure has the following beneficial effects:

1. by the driving assembly designed, before introducing mixed shale gas into the inner side gas-solid separation tank through the shale gas mixture ingress pipe, the electric motor is controlled to be operated, so that the first adapter cylinder drives the first threaded cylinder to rotate in the first bearing finally, on one hand, the first threaded cylinder may drive the connecting sleeve connected onto the surface of the first threaded cylinder to rotate, and on the other hand, under a combined effect of a torsion and a thread bite force, the first threaded cylinder will be displaced on the surface of the first threaded rod, so that the upper and lower layer wheel discs on the connecting sleeve may also move up and down in a reciprocating mode during rotation, so that an oily substance, gravel and other impurities adhered to the inner side gas-solid separation tank may be scraped off, and the gas-solid separation device is effectively prevented from dust accumulation or blockage;

2. by the flow stirring assembly designed, under the drive of the first threaded cylinder, the fixed flow stirring plate located on the upper layer wheel disc, the movable flow stirring plate and the upper layer wheel disc will drive an airflow in the inner side gas-solid separation tank to flow quickly and generate a violent vortex during rotation of the upper layer wheel disc and the lower layer wheel disc on the connecting sleeve, thus enhancing a rotating flow generated by the mixed shale gas entering the inner side gas-solid separation tank, during reciprocating lifting movements of the upper layer wheel disc and the lower layer wheel disc on the connecting sleeve along a vertical direction, since the arc connecting seat is supported by an elastic force of the first supporting spring through the second slidably connecting seat and limited by the inner side gas-solid separation tank, self-regulation and control of an effective number of the movable flow stirring plates are realized by using a particularity of a conical structure of the inner side gas-solid separation tank for changing a state of the vortex of the airflow inside the inner side gas-solid separation tank and disturbing separation of the mixed shale gas in the inner side gas-solid separation tank, so as to adjust a separation efficiency of the inner side gas-solid separation tank, and then make the gas-solid separation more thorough, thus improving a gas-solid separation efficiency, and an acting force on the inner side gas-solid separation tank can also be increased by changing a shape of the vortex, which is beneficial for removing the oily substance, the gravel and other impurities adhered to the inner side gas-solid separation tank; and 3. by the shale gas desanding assembly and the pressure regulation and control assembly arranged, an interlayer formed by combining the outer side gas-solid separation tank with the inner side gas-solid separation tank is communicated with the exhaust channel through the first pressure balance pipe, and the first pressure balance pipe is further provided with the one-way valve, which means that the airflow can only flow to the interlayer along the exhaust channel, so that an air pressure intensity in the interlayer will always keep a maximum value of the air pressure intensity, and the maximum value of the air pressure intensity is an air pressure intensity in a normal operation stage inside the inner side gas-solid separation tank, according to an air pressure intensity of the shale gas mixture ingress pipe in the case of introducing the mixed shale gas, an initial deformation amount of the third supporting spring may be regulated and controlled by turning the knob, by regulating and controlling an initial elastic force of the third supporting spring, when an airflow pressure inside the shale gas mixture ingress pipe is insufficient, gas in the interlayer can enter the shale gas mixture ingress pipe along the second pressure balance pipe to supplement the airflow pressure, which can further improve a stability of the airflow to a certain extent and prevent the airflow from being stirred, and moreover, the introduced gas and the supplemented gas are the same gas, thus avoiding mutual interference between the supplemented gas and the original gas.

Figure 1:
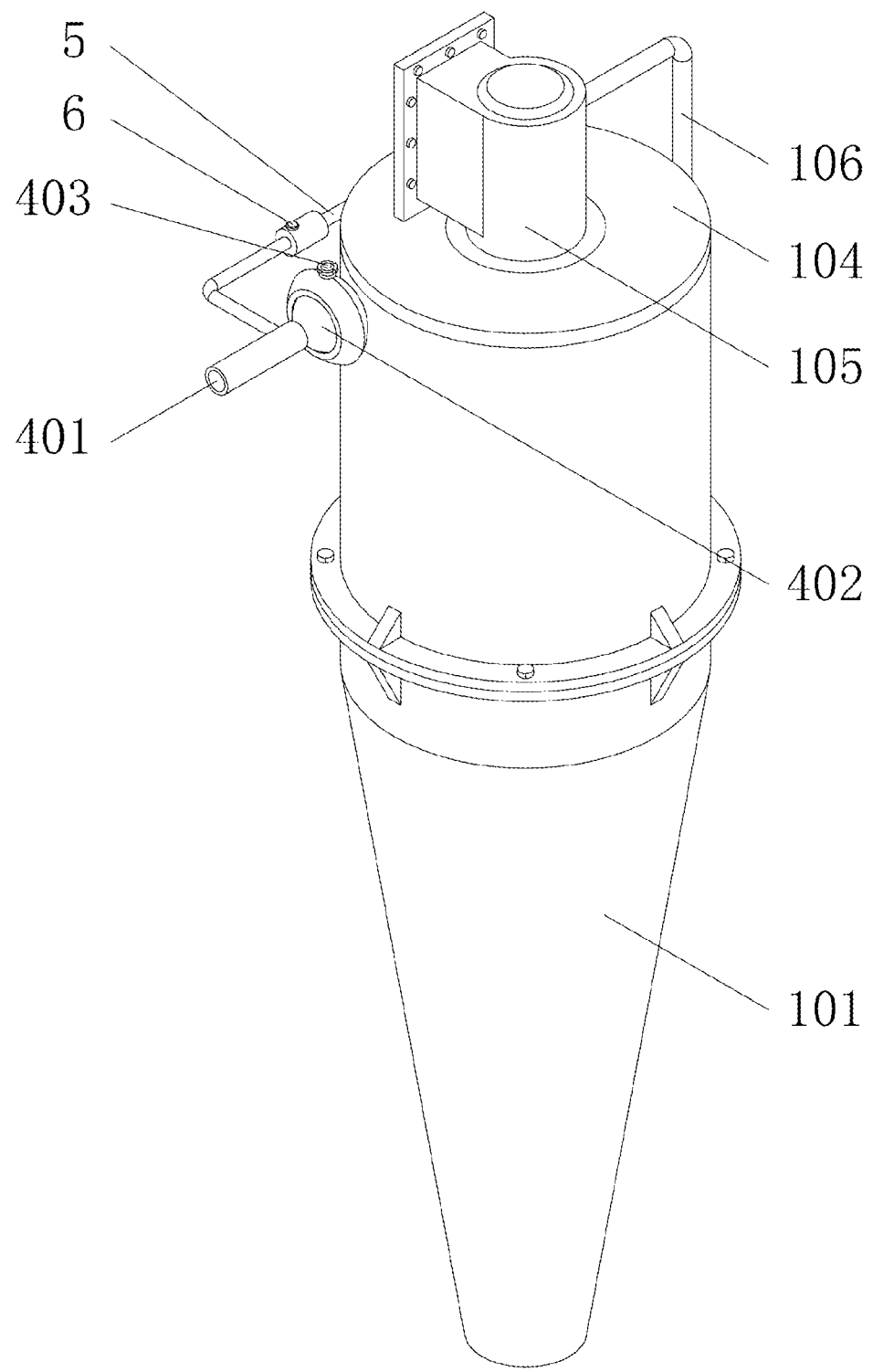
FIG. 1 is a stereoscopic structural diagram of a high-stability shale gas desanding device with a gravel storage mechanism.
Figure 2:
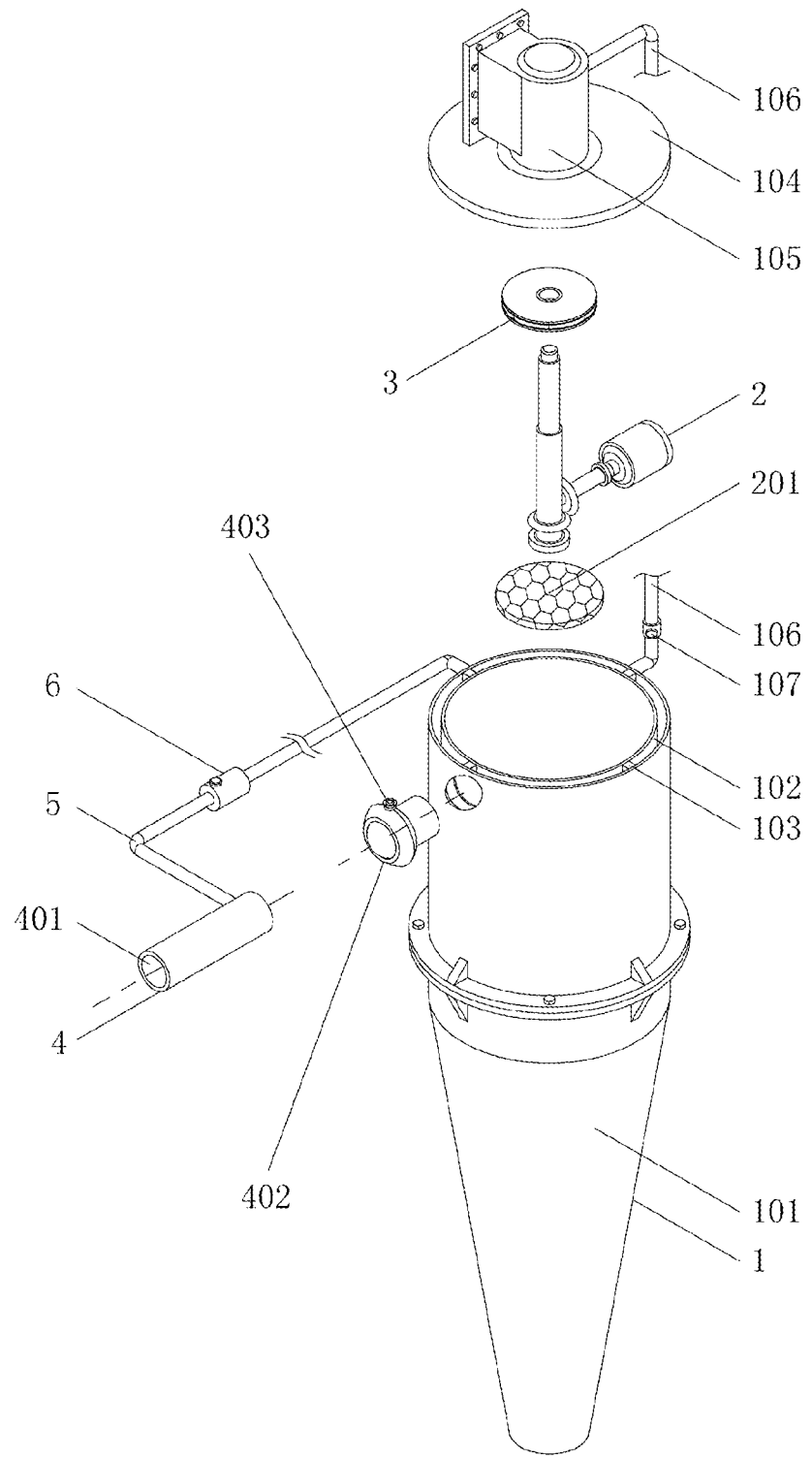
FIG. 2 is an exploded structural diagram of FIG. 1.
Figure 3:
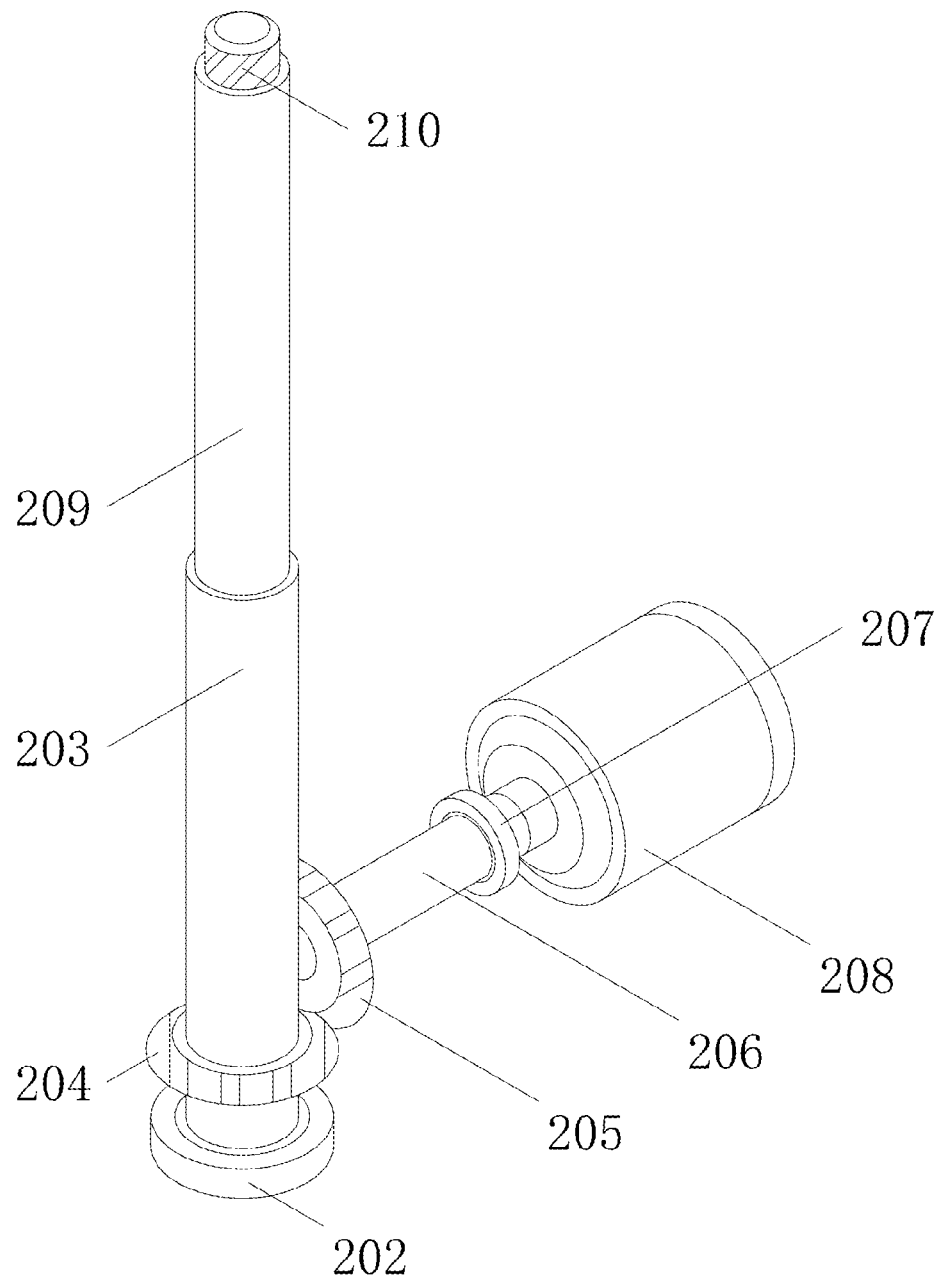
FIG. 3 is a stereoscopic structural diagram of a driving assembly in the present disclosure.
Figure 4:
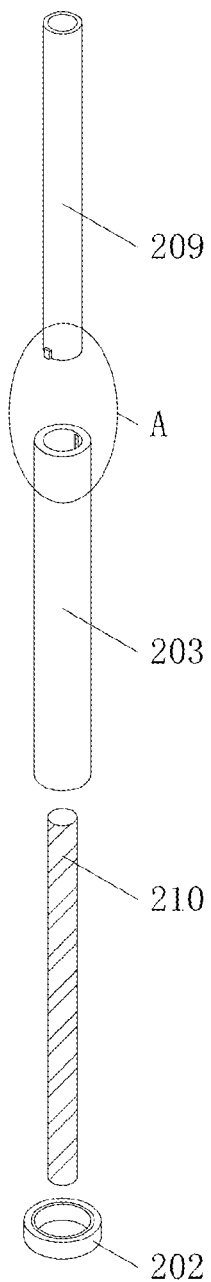
FIG. 4 is an exploded structural diagram of a left side part of FIG. 3.
Figure 5:
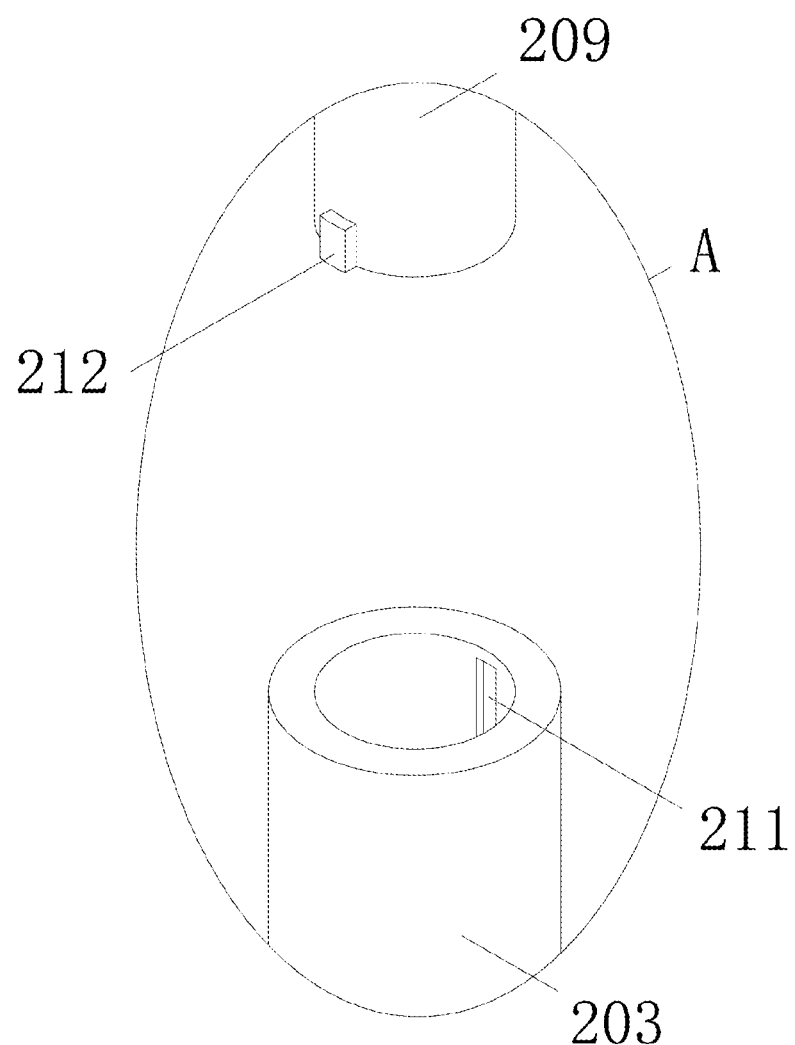
FIG. 5 is an enlarged structural diagram of an A area in FIG. 4.
Figure 6:
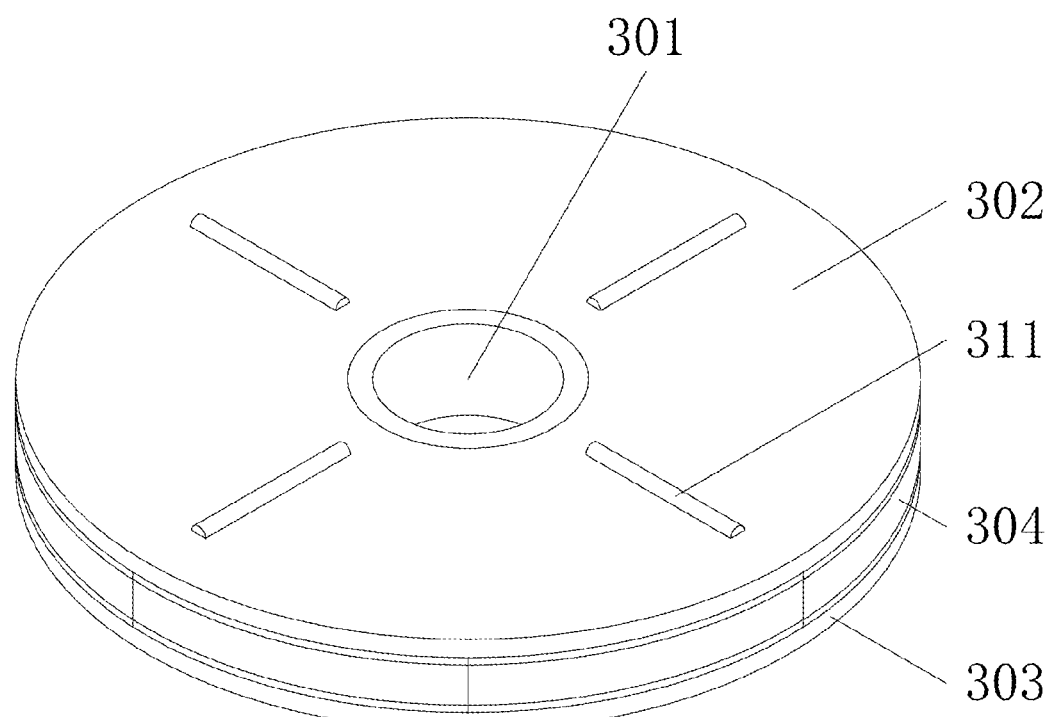
FIG. 6 is a stereoscopic structural diagram of a flow stirring assembly in the present disclosure.
Figure 7:
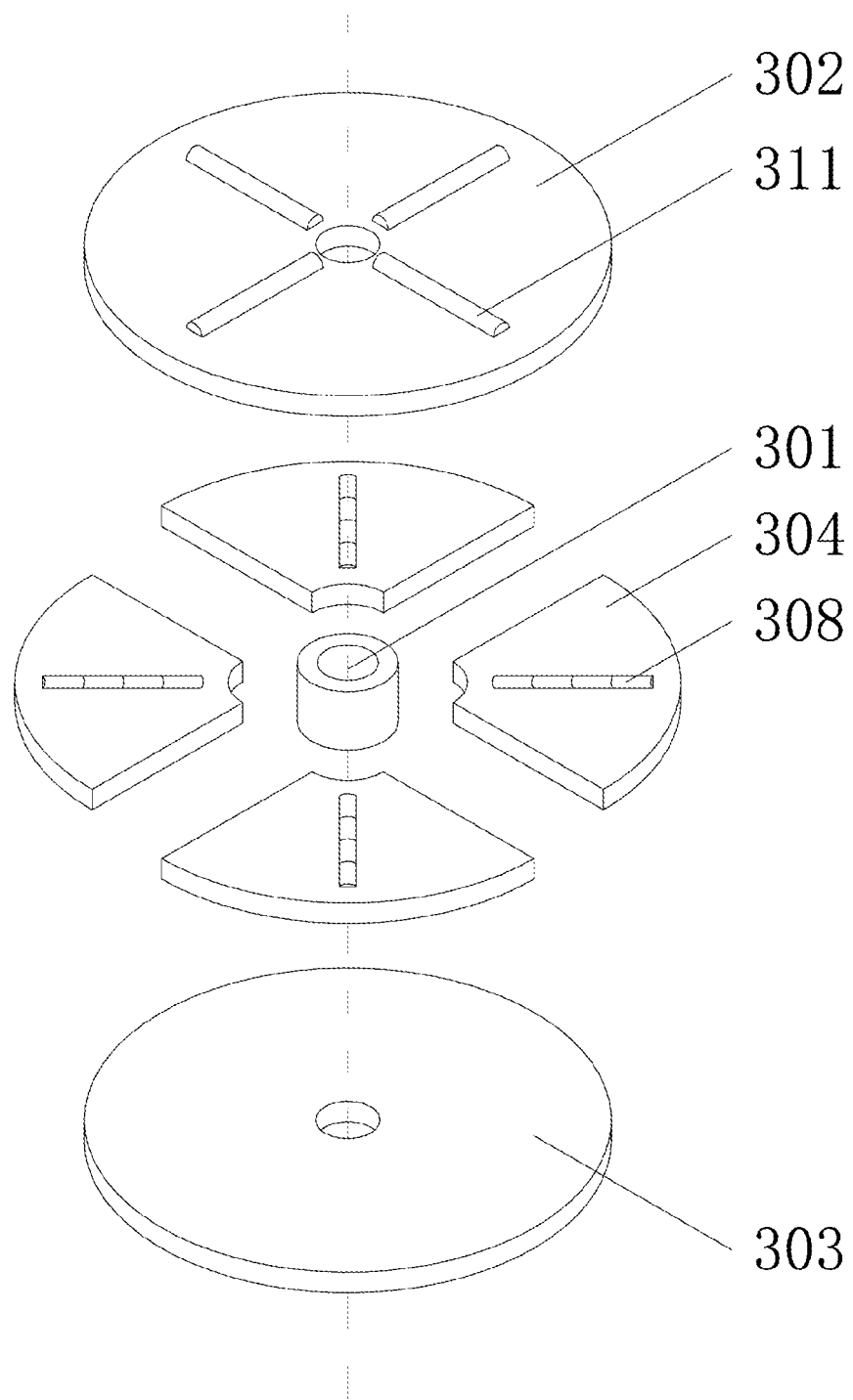
FIG. 7 is an exploded structural diagram of FIG. 6.
Figure 8:
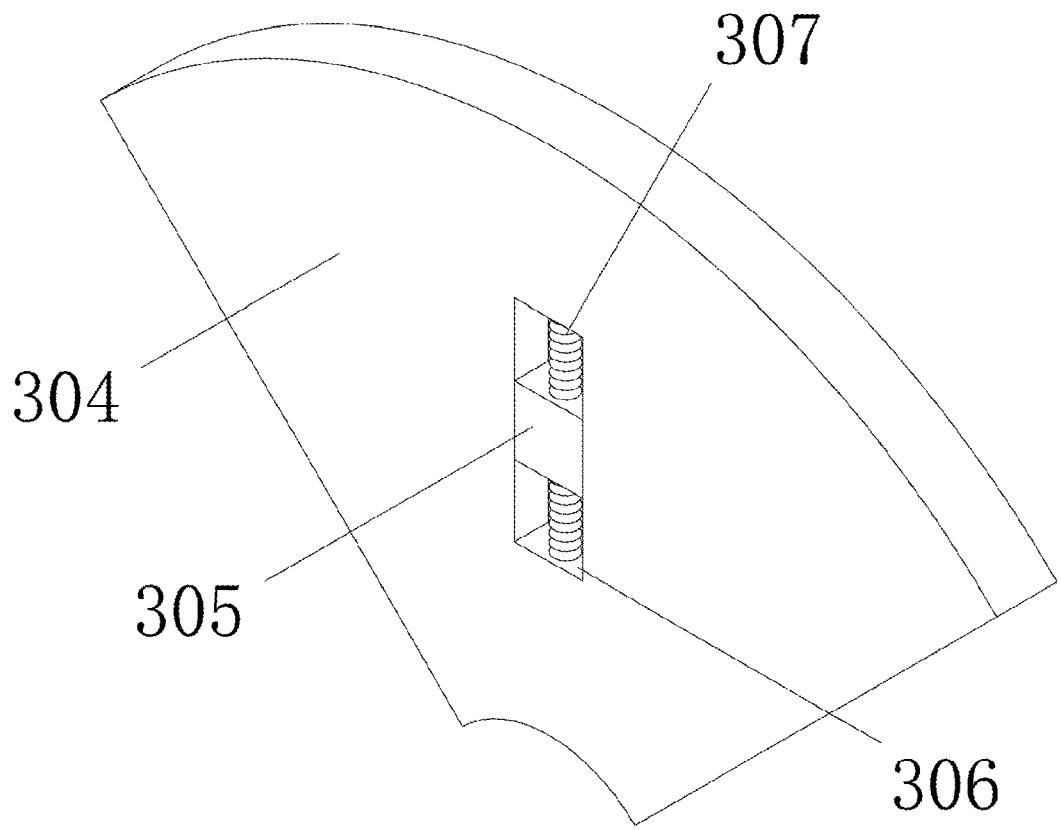
FIG. 8 is a schematic structural diagram of a bottom portion of an arc connecting seat in FIG. 6.
Figure 9:
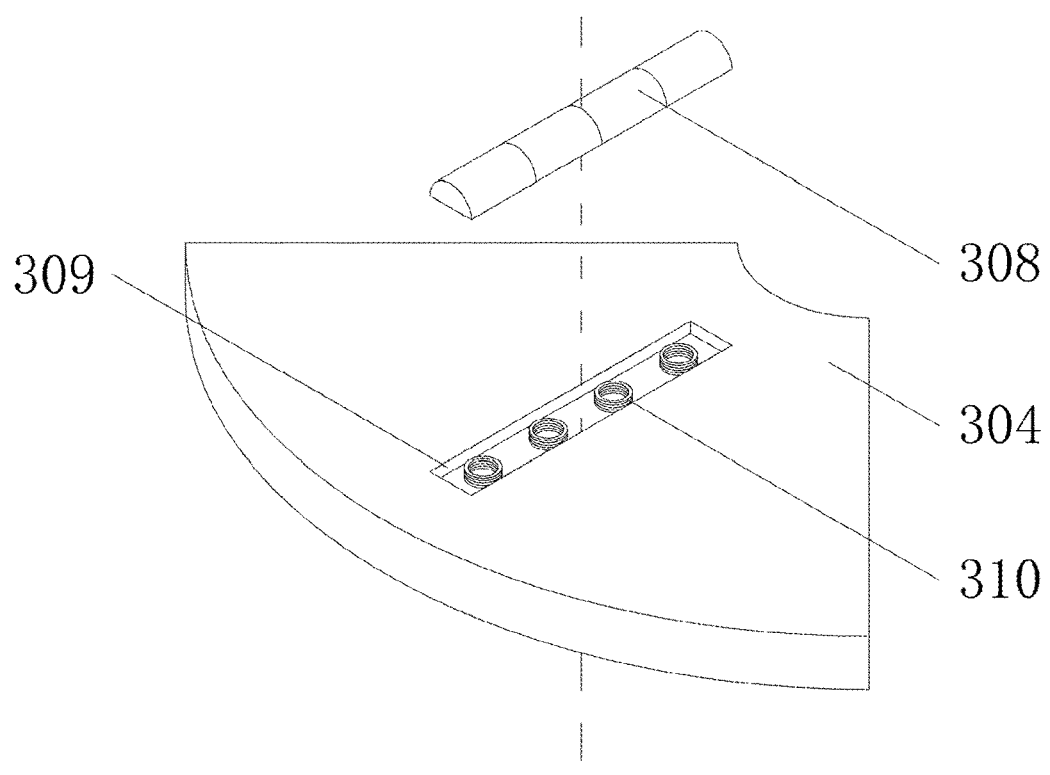
FIG. 9 is a schematic structural diagram of an upper portion of the arc connecting seat in FIG. 6.
Figure 10:
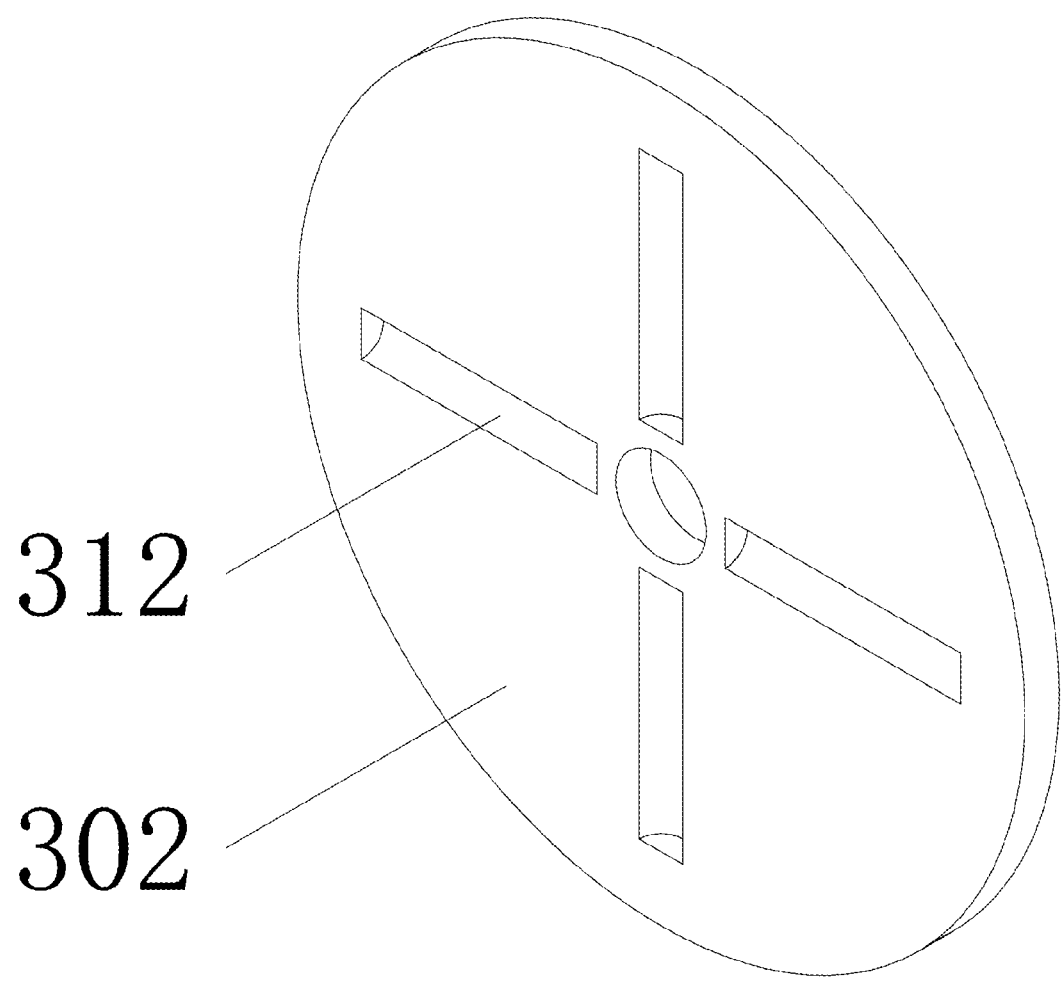
FIG. 10 is a schematic structural diagram of a bottom portion of an upper layer wheel disc in FIG. 6.
Figure 11:
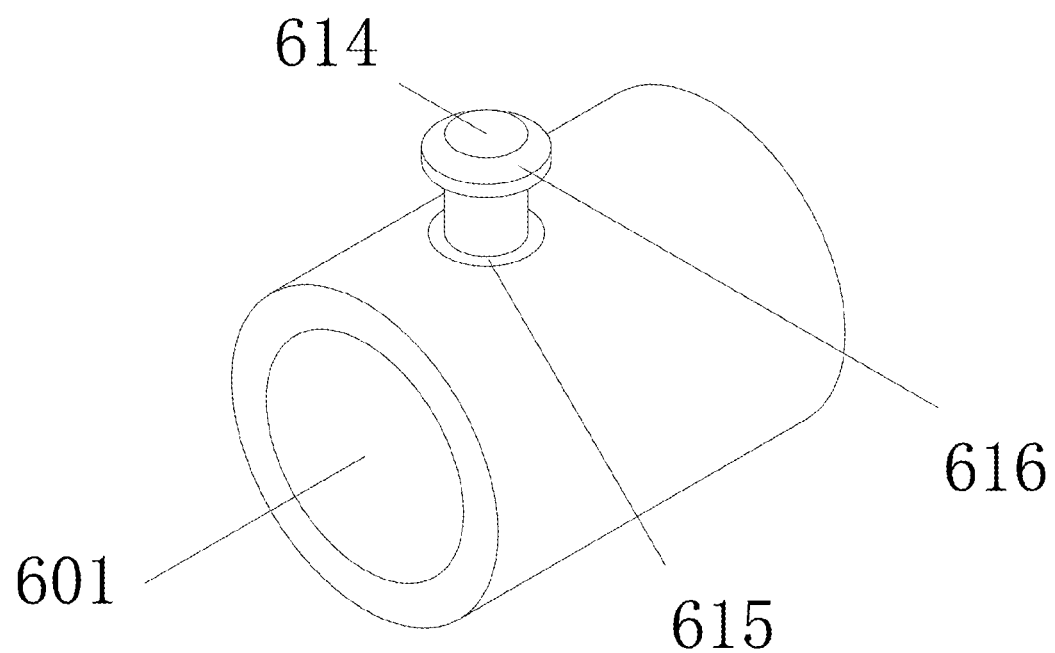
FIG. 11 is a stereoscopic structural diagram of a pressure regulation and control assembly in the present disclosure.

wherein: 1 refers to shale gas desanding assembly; 101 refers to outer side gas-solid separation tank; 102 refers to inner side gas-solid separation tank; 103 refers to bridge-type connecting frame; 104 refers to tank cover; 105 refers to exhaust channel; 106 refers to first pressure balance pipe; 107 refers to one-way valve; 2 refers to driving assembly; 201 refers to first support mesh panel; 202 refers to first bearing; 203 refers to first adapter cylinder; 204 refers to first driven bevel gear; 205 refers to first driving bevel gear; 206 refers to second adapter cylinder; 207 refers to second bearing; 208 refers to electric motor; 209 refers to first threaded cylinder; 210 refers to first threaded rod; 211 refers to first slidably connecting groove; 212 refers to first slidably connecting seat; 3 refers to flow stirring assembly; 301 refers to connecting sleeve; 302 refers to upper layer wheel disc; 303 refers to lower layer wheel disc; 304 refers to arc connecting seat; 305 refers to second slidably connecting seat; 306 refers to second slidably connecting groove; 307 refers to first supporting spring; 308 refers to movable flow stirring plate; 309 refers to retracting groove; 310 refers to second supporting spring; 311 refers to fixed flow stirring plate; 312 refers to implanting groove; 4 refers to flow guide assembly; 401 refers to shale gas mixture ingress pipe; 402 refers to first spherical valve; 403 refers to control knob; 5 refers to second pressure balance pipe; 6 refers to pressure regulation and control assembly; 601 refers to connecting pipe; 602 refers to conical body; 603 refers to second spherical valve; 604 refers to guide rod; 605 refers to third supporting spring; 606 refers to second threaded cylinder; 607 refers to fixing rib; 608 refers to second threaded rod; 609 refers to second support mesh panel; 610 refers to third bearing; 611 refers to third adapter cylinder; 612 refers to second driven bevel gear; 613 refers to second driving bevel gear; 614 refers to fourth adapter cylinder; 615 refers to fourth bearing; 616 refers to knob; 617 refers to third slidably connecting groove; and 618 refers to third slidably connecting seat.

DETAILED DESCRIPTION OF THE PREFERRED EMBODIMENTS

The present disclosure is further described in detail hereinafter with reference to the drawings and the specific embodiments.

As shown in FIG. 1 to FIG. 13, a high-stability shale gas desanding device with a gravel storage mechanism comprises a shale gas desanding assembly 1, a driving assembly 2, a flow stirring assembly 3 and a flow guide assembly 4. The shale gas desanding assembly 1 comprises an outer side gas-solid separation tank 101, an inner side gas-solid separation tank 102 is sleeved inside the outer side gas-solid separation tank 101, the inner side gas-solid separation tank 102 is communicated with a shale gas mixture ingress pipe 401 of the flow guide assembly 4, a top portion of the shale gas desanding assembly 1 is communicated with an interior of the outer side gas-solid separation tank 101 through a first pressure balance pipe 106, the outer side gas-solid separation tank 101 is communicated with the shale gas mixture ingress pipe 401 through a second pressure balance pipe 5, a pressure regulation and control assembly 6 is arranged on the second pressure balance pipe 5, the liftable and rotatable flow stirring assembly 3 is further arranged inside the inner side gas-solid separation tank 102, and an input end of the flow stirring assembly 3 is connected with an output end of the driving assembly 2.

Preferably, the inner side gas-solid separation tank 102 and the outer side gas-solid separation tank 101 are fixedly connected through a bridge-type connecting frame 103, and top portions of the outer side gas-solid separation tank 101 and the inner side gas-solid separation tank 102 are fixedly and hermetically connected with a same tank cover 104, an exhaust channel 105 is clamped in the tank cover 104, a side end surface of the exhaust channel 105 is clamped with the first pressure balance pipe 106, the other end of the first pressure balance pipe 106 is clamped on a side end surface of the outer side gas-solid separation tank 101, and the first pressure balance pipe 106 is further provided with a one-way valve 107. In the embodiment, an interlayer formed by combining the outer side gas-solid separation tank 101 with the inner side gas-solid separation tank 102 is communicated with the exhaust channel 105 through the first pressure balance pipe 106, and the first pressure balance pipe 106 is further provided with the one-way valve 107, which means that the airflow can only flow to the interlayer along the exhaust channel 105, so that an air pressure intensity in the interlayer will always keep a maximum value of the air pressure intensity.

Preferably, the driving assembly 2 comprises a first support mesh panel 201, an arc surface of the first support mesh panel 201 is fixedly connected with an inner side wall of the inner side gas-solid separation tank 102, a top portion of the first support mesh panel 201 is clamped with a first bearing 202, a first adapter cylinder 203 is sleeved in the first bearing 202, a first threaded cylinder 209 is sleeved in the first adapter cylinder 203, a first threaded rod 210 is threadedly connected on an internal thread surface of the first threaded cylinder 209, and a bottom portion of the first threaded rod 210 is fixedly connected to a top portion of the first support mesh panel 201.

Preferably, an outer surface of the first threaded cylinder 209 is fixedly connected with a first slidably connecting seat 212, the first slidably connecting seat 212 is slidably connected in a first slidably connecting groove 211 formed on an inner circular surface of the first adapter cylinder 203, a surface of the first adapter cylinder 203 is fixedly connected with a first driven bevel gear 204, and a surface of the first driven bevel gear 204 is meshed with a first driving bevel gear 205. The first driving bevel gear 205 is fixedly connected to a surface of a second adapter cylinder 206, the surface of the second adapter cylinder 206 is further sleeved with a second bearing 207, the second bearing 207 is clamped on wall bodies of the outer side gas-solid separation tank 101 and the inner side gas-solid separation tank 102 respectively, an end portion of the second adapter cylinder 206 is fixedly connected with an output end of an electric motor 208, and a side end surface of a body of the electric motor 208 is fixedly connected with the side end surface of the outer side gas-solid separation tank 101 through a shock absorbing seat.

In the technical solution above, before introducing mixed shale gas into the inner side gas-solid separation tank 102 through the shale gas mixture ingress pipe 401, the electric motor 208 is controlled to be operated, and during operation of the electric motor 208, an output shaft of the electric motor may drive the first driving bevel gear 205 to rotate in the second bearing 207 through the second adapter cylinder 206, a torque is transferred to the first adapter cylinder 203 by using a linkage effect between the first driving bevel gear 205 and the first driven bevel gear 204, and the first threaded cylinder 209 is driven to rotate in the first bearing 202 through the first adapter cylinder 203.

Preferably, the flow stirring assembly 3 comprises a connecting sleeve 301, the connecting sleeve 301 is sleeved and fixed on a surface of the first threaded cylinder 209, an upper layer wheel disc 302 and a lower layer wheel disc 303 are sequentially fixed and connected on a circumferential surface of the connecting sleeve 301 from top to bottom, and an arc connecting seat 304 is slidably connected between the upper layer wheel disc 302 and the lower layer wheel disc 303.

Preferably, a bottom portion of the arc connecting seat 304 is provided with a second slidably connecting groove 306, a second slidably connecting seat 305 is slidably connected in the second slidably connecting groove 306, an end surface inside the second slidably connecting groove 306 is further fixedly connected with a side surface of the second slidably connecting seat 305 through a first supporting spring 307, and a bottom portion of the second slidably connecting seat 305 is fixedly connected to a top portion of the lower layer wheel disc 303.

Preferably, a top portion of the arc connecting seat 304 is provided with a retracting groove 309, a bottom portion inside the retracting groove 309 is connected with a movable flow stirring plate 308 through a second supporting spring 310, a bottom portion of the upper layer wheel disc 302 is further provided with an implanting groove 312 matched with the movable flow stirring plate 308, one surfaces of the upper layer wheel disc 302 and the lower layer wheel disc 303 far away from each other are both fixedly connected with a fixed flow stirring plate 311, the fixed flow stirring plates 311 and the movable flow stirring plates 308 are staggered, and corners of the movable flow stirring plates 308 are designed to be circular arcs.

In the technical solution above, the fixed flow stirring plate 311 located on the upper layer wheel disc 302, the movable flow stirring plate 308 and the upper layer wheel disc 302 will drive an airflow in the inner side gas-solid separation tank 102 to flow quickly and generate a violent vortex during rotation of the upper layer wheel disc 302 and the lower layer wheel disc 303 on the connecting sleeve 301, thus enhancing a rotating flow generated by the mixed shale gas entering the inner side gas-solid separation tank 102. During reciprocating lifting movements of the upper layer wheel disc 302 and the lower layer wheel disc 303 on the connecting sleeve 301 along a vertical direction, since the arc connecting seat 304 is supported by an elastic force of the first supporting spring 307 through the second slidably connecting seat 305 and limited by the inner side gas-solid separation tank 102, self-regulation and control of an effective number of the movable flow stirring plates 308 are realized by using a particularity of a conical structure of the inner side gas-solid separation tank 102 for changing a state of the vortex of the airflow inside the inner side gas-solid separation tank 102. An elastic supporting effect of the first supporting spring 307 acts on the arc connecting seat 304 through the second slidably connecting seat 305 for ensuring a basic stability of the arc connecting seat 304. When the arc connecting seat 304 is not affected by a centrifugal force, a restoring effect may be realized automatically under the supporting effect of the first supporting spring 307, and when the arc connecting seat 304 is affected by the centrifugal force, due to an elastic connection relationship between the arc connecting seat 304 and the second slidably connecting seat 305, an outward extension degree of the arc connecting seat 304 can be automatically controlled according to the centrifugal force and an inner diameter of the inner side gas-solid separation tank 102. By the second supporting spring 310 designed, the second supporting spring 310 exerts supporting and fixing effects on the movable flow stirring plate 308. When the arc connecting seat 304 extends outwardly under an action of the centrifugal force, a corresponding number of movable flow stirring plates 308 will automatically extend out of the retracting groove 309 under the drive of a restoring elastic force of the second supporting spring 310. When the arc connecting seat 304 is driven to restore under an action of the restoring elastic force of the first supporting spring 307, due to an elastic connection relationship between the movable flow stirring plates 308 and the retracting groove 309, the movable flow stirring plates 308 will automatically retract into the retracting groove 309, thus effectively ensuring smooth outward extension and inward retraction of the arc connecting seat 304. However, in order to reduce collision friction between the movable flow stirring plates 308 during retraction and the upper layer wheel disc 302 or collision friction between the movable flow stirring plates during outward extension and the implanting groove 312, corners of the movable flow stirring plates 308 are designed to be circular arcs, so that the movable flow stirring plates 308 may retract into the retracting groove 309 or withdraw from the implanting groove 312 more easily.

Preferably, the flow guide assembly 4 comprises the shale gas mixture ingress pipe 401, the shale gas mixture ingress pipe 401 is provided with a first spherical valve 402, the shale gas mixture ingress pipe 401 sequentially passes through wall bodies of the outer side gas-solid separation tank 101 and the inner side gas-solid separation tank 102 and extends inside the inner side gas-solid separation tank 102, and an upper portion of the first spherical valve 402 is provided with a control knob 403. By opening the first spherical valve 402, the shale gas mixture may enter the inner side gas-solid separation tank 102 from the shale gas mixture ingress pipe 401 generally along a tangential direction close to the inner side gas-solid separation tank 102.

Preferably, the pressure regulation and control assembly 6 comprises a connecting pipe 601, the connecting pipe 601 is sleeved on the second pressure balance pipe 5, an inner side wall of the second pressure balance pipe 5 is fixedly connected with a conical body 602, the conical body 602 is connected with a second spherical valve 603 in an embedded mode, a spherical surface of the second spherical valve 603 is fixedly connected with a guide rod 604, a surface of the guide rod 604 is sleeved with a second threaded cylinder 606, and an outer circumferential surface of the second threaded cylinder 606 is fixedly connected with an inner pipe wall of the connecting pipe 601 through a fixing rib 607.

Preferably, one side inside the second threaded cylinder 606 is threadedly matched with one side of a second threaded rod 608, an end portion of the second threaded rod 608 is fixedly connected with one end of the guide rod 604 through a third supporting spring 605, and a surface on the other side of the second threaded rod 608 is sleeved with a third adapter cylinder 611 slidably matched with the second threaded rod. An inner side wall of the third adapter cylinder 611 is provided with a third slidably connecting groove 617, a third slidably connecting seat 618 is slidably connected in the third slidably connecting groove 617, the third slidably connecting seat 618 is fixedly connected with the second threaded rod 608, a surface of the third adapter cylinder 611 is sleeved with a third bearing 610, the third bearing 610 is clamped on a second support mesh panel 609, and an outer cambered surface of the second support mesh panel 609 is fixedly connected with the inner pipe wall of the connecting pipe 601. A surface of the third adapter cylinder 611 is fixedly connected with a second driven bevel gear 612, a surface of the second driven bevel gear 612 is meshed with a second driving bevel gear 613, the second driving bevel gear 613 is fixedly connected at a bottom portion of a fourth adapter cylinder 614, a surface of the fourth adapter cylinder 614 is further sleeved with a fourth bearing 615, the fourth bearing 615 is clamped on a top pipe wall of the connecting pipe 601, and a top end of the fourth adapter cylinder 614 is fixedly connected with a knob 616.

A working principle of the embodiment is as follows.

Figure 12:
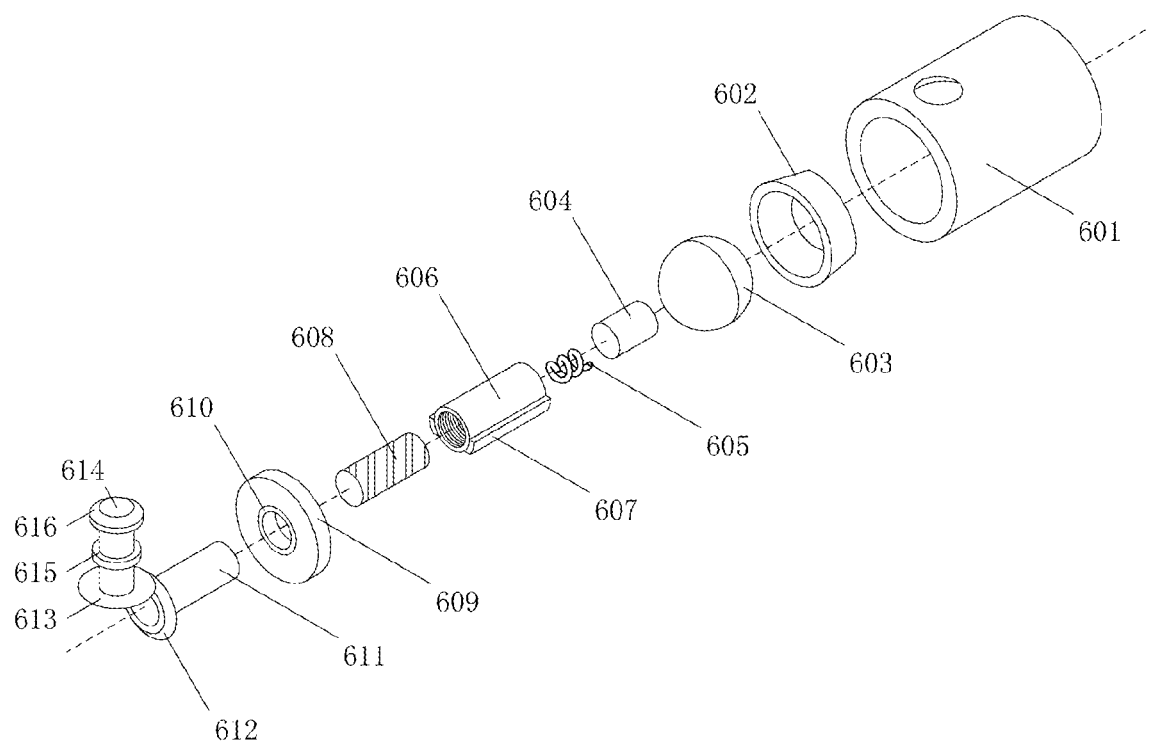
FIG. 12 is an exploded structural diagram of FIG. 11.
Figure 13:
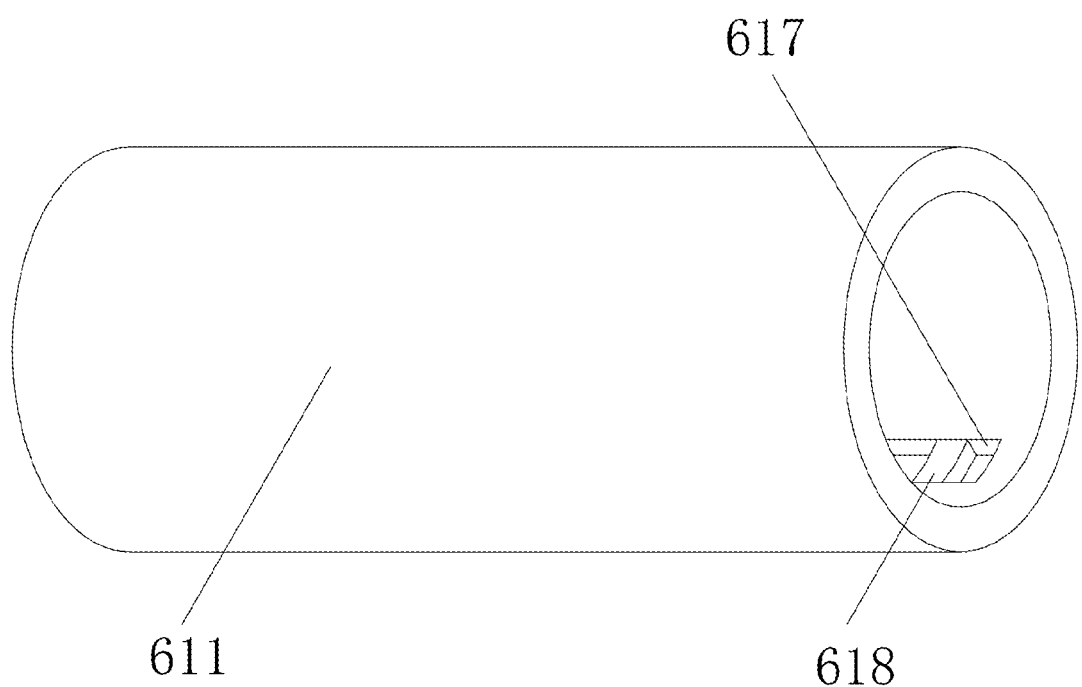
FIG. 13 is a stereoscopic structural diagram of a third adapter cylinder in FIG. 12.

The first spherical valve 402 is opened to make the shale gas mixture enter the inner side gas-solid separation tank 102 from the shale gas mixture ingress pipe 401, and the mixed shale gas will rotate violently after entering the inner side gas-solid separation tank 102. In addition, before introducing the mixed shale gas into the inner side gas-solid separation tank 102 through the shale gas mixture ingress pipe 401, the electric motor 208 is controlled to be operated, and during operation of the electric motor 208, an output shaft of the electric motor will drive the first driving bevel gear 205 to rotate in the second bearing 207 through the second adapter cylinder 206, a torque is transferred to the first adapter cylinder 203 by using a linkage effect between the first driving bevel gear 205 and the first driven bevel gear 204, and the first threaded cylinder 209 is driven to rotate in the first bearing 202 through the first adapter cylinder 203. On one hand, the first threaded cylinder 209 will drive the connecting sleeve 301 connected onto the surface of the first threaded cylinder to rotate, and on the other hand, under a combined effect of a torsion and a thread bite force, the first threaded cylinder 209 will be displaced on the surface of the first threaded rod 210, so that the upper layer wheel disc 302 and the lower layer wheel disc 303 on the connecting sleeve 301 will also move up and down in a reciprocating mode during rotation. Under the drive of the first threaded cylinder 209, the fixed flow stirring plate 311 located on the upper layer wheel disc 302, the movable flow stirring plate 308 and the upper layer wheel disc 302 will drive an airflow in the inner side gas-solid separation tank 102 to flow quickly and generate a violent vortex during rotation of the upper layer wheel disc 302 and the lower layer wheel disc 303 on the connecting sleeve 301, thus enhancing a rotating flow generated by the mixed shale gas entering the inner side gas-solid separation tank 102. During reciprocating lifting movements of the upper layer wheel disc 302 and the lower layer wheel disc 303 on the connecting sleeve 301 along a vertical direction, since the arc connecting seat 304 is supported by an elastic force of the first supporting spring 307 through the second slidably connecting seat 305 and limited by the inner side gas-solid separation tank 102, self-regulation and control of an effective number of the movable flow stirring plates 308 are realized by using a particularity of a conical structure of the inner side gas-solid separation tank 102 assisted by the centrifugal force and the outward extension degree of the arc connecting seat 304 for changing a state of the vortex of the airflow inside the inner side gas-solid separation tank 102 and disturbing separation of the mixed shale gas in the inner side gas-solid separation tank 102, so as to adjust a separation efficiency of the inner side gas-solid separation tank 102, and then make the gas-solid separation more thorough. An acting force on the inner side gas-solid separation tank 102 can also be increased by changing a shape of the vortex, and the oily substance, the gravel and other impurities adhered to the inner side gas-solid separation tank 102 may be scratched off during lifting movements of the upper layer wheel disc 302, the lower layer wheel disc 303 and the arc connecting seat 304. An interlayer formed by combining the outer side gas-solid separation tank 101 with the inner side gas-solid separation tank 102 is communicated with the exhaust channel 105 through the first pressure balance pipe 106, and the first pressure balance pipe 106 is further provided with the one-way valve 107, which means that the airflow can only flow to the interlayer along the exhaust channel 105, so that an air pressure intensity in the interlayer will always keep a maximum value of the air pressure intensity, and the maximum value of the air pressure intensity is an air pressure intensity in a normal operation stage inside the inner side gas-solid separation tank 102. According to an air pressure intensity of the shale gas mixture ingress pipe 401 in the case of introducing the mixed shale gas, the knob 616 is turned to drive the fourth adapter cylinder 614 to rotate in the fourth bearing 615. A torque is transferred to the third adapter cylinder 611 by using a linkage effect between the second driving bevel gear 613 and the second driven bevel gear 612, and the second threaded rod 608 is driven to rotate in the first threaded cylinder 209 through the third slidably connecting seat 618. Under a combined effect of the torsion and a thread bite force, the second threaded rod 608 will be displaced in the second threaded cylinder 606, so that an initial deformation amount of the third supporting spring 605 may be regulated and controlled, and an elastic force of the third supporting spring 605 may be changed. As shown in FIG. 12, the conical body 602 is a frustum-like cylindrical structure, with a left side contacted with the spherical surface of the second spherical valve 603 and a right side communicated with the interlayer (which is namely the interlayer formed by combining the outer side gas-solid separation tank 101 with the inner side gas-solid separation tank 102) through the connecting pipe 601 and the second pressure balance pipe 5. According to stress balance analysis, when the spherical surface of the second spherical valve 603 blocks the left side of the conical body 602, the elastic force of the third supporting spring 605 and the air pressure in the shale gas mixture ingress pipe 401 are greater than the air pressure in the interlayer, and then the spherical surface of the second spherical valve 603 can tightly adhere to the conical body 602, thus intercepting gas flowing from the interlayer to the second pressure balance pipe 5. Therefore, when the airflow pressure inside the shale gas mixture ingress pipe 401 is insufficient, the elastic force of the third supporting spring 605 is insufficient to press the spherical surface of the second spherical valve 603 against the left side of the conical body 602, and at the moment, the gas in the interlayer may flush through the second spherical valve 603 and make the second spherical valve move to the left, thus releasing the blockage of the conical body 602 by the spherical surface of the second spherical valve 603. When the second spherical valve 603 releases the intercepting effect on the gas, the gas in the interlayer can enter the shale gas mixture ingress pipe 401 along the second pressure balance pipe 5 to supplement the airflow pressure in the shale gas mixture ingress pipe, which can improve a stability of the airflow to a certain extent and prevent the airflow from being stirred. In addition, the original introduced gas and the supplemented gas of the shale gas mixture ingress pipe 401 are the same gas, thus avoiding mutual interference between the supplemented gas and the original gas.

The above embodiments are only preferred technical solutions of the present disclosure, and should not be regarded as limiting the present disclosure. The embodiments in the present application and the features in the embodiments can be arbitrarily combined with each other without conflict. The scope of protection of the present disclosure shall be the technical solutions recorded in the claims, including the equivalent alternatives of the technical features in the technical solutions recorded in the claims. Equivalent substitutions and improvements in the scope are also included in the scope of protection of the present disclosure.

The invention claimed is:

1. A high-stability shale gas desanding device with a gravel storage mechanism, comprising a shale gas desanding assembly, a driving assembly, a flow stirring assembly and a flow guide assembly, wherein the shale gas desanding assembly comprises an outer side gas-solid separation tank, an inner side gas-solid separation tank is sleeved inside the outer side gas-solid separation tank, the inner side gas-solid separation tank is communicated with a shale gas mixture ingress pipe of the flow guide assembly, a top portion of the shale gas desanding assembly is communicated with an interior of the outer side gas-solid separation tank through a first pressure balance pipe, the outer side gas-solid separation tank is communicated with the shale gas mixture ingress pipe through a second pressure balance pipe, a pressure regulation and control assembly is arranged on the second pressure balance pipe, the flow stirring assembly is further arranged inside the inner side gas-solid separation tank, and an input end of the flow stirring assembly is connected with an output end of the driving assembly; and the inner side gas-solid separation tank and the outer side gas-solid separation tank are fixedly connected through a bridge-type connecting frame, and top portions of the outer side gas-solid separation tank and the inner side gas-solid separation tank are fixedly and hermetically connected with a same tank cover, an exhaust channel is clamped in the tank cover, a side end surface of the exhaust channel is clamped with the first pressure balance pipe, a second end of the first pressure balance pipe is clamped on a side end surface of the outer side gas-solid separation tank, and the first pressure balance pipe is further provided with a one-way valve;

wherein the driving assembly comprises a first support mesh panel, an arc surface of the first support mesh panel is fixedly connected with an inner side wall of the inner side gas-solid separation tank, a top portion of the first support mesh panel is clamped with a first bearing, a first adapter cylinder is sleeved in the first bearing, a first threaded cylinder is sleeved in the first adapter cylinder, a first threaded rod is threadedly connected on an internal thread surface of the first threaded cylinder, and a bottom portion of the first threaded rod is fixedly connected to a top portion of the first support mesh panel;

the flow stirring assembly comprises a connecting sleeve, the connecting sleeve is sleeved and fixed on a surface of the first threaded cylinder, an upper layer wheel disc and a lower layer wheel disc are sequentially fixed and connected on a circumferential surface of the connecting sleeve from top to bottom, and an arc connecting seat is slidably connected between the upper layer wheel disc and the lower layer wheel disc; and a bottom portion of the arc connecting seat is provided with a second slidably connecting groove, a second slidably connecting seat is slidably connected in the second slidably connecting groove, an end surface inside the second slidably connecting groove is further fixedly connected with a side surface of the second slidably connecting seat through a first supporting spring, and a bottom portion of the second slidably connecting seat is fixedly connected to a top portion of the lower layer wheel disc.

2. The high-stability shale gas desanding device with the gravel storage mechanism according to claim 1, wherein an outer surface of the first threaded cylinder is fixedly connected with a first slidably connecting seat, the first slidably connecting seat is slidably connected in a first slidably connecting groove formed on an inner circular surface of the first adapter cylinder, a surface of the first adapter cylinder is fixedly connected with a first driven bevel gear, and a surface of the first driven bevel gear is meshed with a first driving bevel gear; the first driving bevel gear is fixedly connected to a surface of a second adapter cylinder, the surface of the second adapter cylinder is further sleeved with a second bearing, the second bearing is clamped on wall bodies of the outer side gas-solid separation tank and the inner side gas-solid separation tank respectively, an end portion of the second adapter cylinder is fixedly connected with an output end of an electric motor, and a side end surface of a body of the electric motor is fixedly connected with the side end surface of the outer side gas-solid separation tank through a shock absorbing seat.

3. The high-stability shale gas desanding device with the gravel storage mechanism according to claim 1, wherein a top portion of the arc connecting seat is provided with a retracting groove, a bottom portion inside the retracting groove is connected with a movable flow stirring plate through a second supporting spring, a bottom portion of the upper layer wheel disc is further provided with an implanting groove matched with the movable flow stirring plate, one surfaces of the upper layer wheel disc and the lower layer wheel disc far away from each other are both fixedly connected with a fixed flow stirring plate, the fixed flow stirring plates and the movable flow stirring plates are staggered, and corners of the movable flow stirring plates are designed to be circular arcs.

4. The high-stability shale gas desanding device with the gravel storage mechanism according to claim 1, wherein the flow guide assembly comprises the shale gas mixture ingress pipe, the shale gas mixture ingress pipe is provided with a first spherical valve, the shale gas mixture ingress pipe sequentially passes through wall bodies of the outer side gas-solid separation tank and the inner side gas-solid separation tank and extends inside the inner side gas-solid separation tank, and an upper portion of the first spherical valve is provided with a control knob.

5. The high-stability shale gas desanding device with the gravel storage mechanism according to claim 1, wherein the pressure regulation and control assembly comprises a connecting pipe, the connecting pipe is sleeved on the second pressure balance pipe, an inner side wall of the second pressure balance pipe is fixedly connected with a conical body, the conical body is connected with a second spherical valve in an embedded mode, a spherical surface of the second spherical valve is fixedly connected with a guide rod, a surface of the guide rod is sleeved with a second threaded cylinder, and an outer circumferential surface of the second threaded cylinder is fixedly connected with an inner pipe wall of the connecting pipe through a fixing rib.

6. The high-stability shale gas desanding device with the gravel storage mechanism according to claim 5, wherein one side inside the second threaded cylinder is threadedly matched with one side of a second threaded rod, an end portion of the second threaded rod is fixedly connected with one end of the guide rod through a third supporting spring, a surface on the other side of the second threaded rod is sleeved with a third adapter cylinder slidably matched with the second threaded rod, an inner side wall of the third adapter cylinder is provided with a third slidably connecting groove, a third slidably connecting seat is slidably connected in the third slidably connecting groove, the third slidably connecting seat is fixedly connected with the second threaded rod, a surface of the third adapter cylinder is sleeved with a third bearing, the third bearing is clamped on a second support mesh panel, an outer cambered surface of the second support mesh panel is fixedly connected with the inner pipe wall of the connecting pipe, a surface of the third adapter cylinder is fixedly connected with a second driven bevel gear, a surface of the second driven bevel gear is meshed with a second driving bevel gear, the second driving bevel gear is fixedly connected at a bottom portion of a fourth adapter cylinder, a surface of the fourth adapter cylinder is further sleeved with a fourth bearing, the fourth bearing is clamped on a top pipe wall of the connecting pipe, and a top end of the fourth adapter cylinder is fixedly connected with a knob.

\* \* \* \* \*